United States Patent
Twitchell, Jr.

(10) Patent No.: US 7,542,849 B2
(45) Date of Patent: *Jun. 2, 2009

(54) NETWORK AIDED TERRESTRIAL TRIANGULATION USING STARS (NATTS)

(75) Inventor: Robert W. Twitchell, Jr., Cumming, GA (US)

(73) Assignee: Terahop Networks, Inc., Alpharetta, GA (US)

( * ) Notice: Subject to any disclaimer, the term of this patent is extended or adjusted under 35 U.S.C. 154(b) by 324 days.

This patent is subject to a terminal disclaimer.

(21) Appl. No.: 11/422,306

(22) Filed: Jun. 5, 2006

(65) Prior Publication Data

US 2006/0282217 A1    Dec. 14, 2006

Related U.S. Application Data

(60) Provisional application No. 60/687,073, filed on Jun. 3, 2005.

(51) Int. Cl.
*G01C 21/00* (2006.01)
(52) U.S. Cl. .................. 701/222; 701/200
(58) Field of Classification Search ............ 701/222, 701/200
See application file for complete search history.

(56) References Cited

U.S. PATENT DOCUMENTS

| | | |
|---|---|---|
| 4,613,990 A | 9/1986 | Halpern |
| 4,680,583 A | 7/1987 | Grover |
| 5,040,238 A | 8/1991 | Comroe et al. |
| 5,117,501 A | 5/1992 | Childress et al. |
| 5,129,096 A | 7/1992 | Burns |
| 5,210,540 A | 5/1993 | Masumoto |
| 5,265,025 A | 11/1993 | Hirata |
| 5,295,154 A | 3/1994 | Meier et al. |
| 5,331,637 A | 7/1994 | Francis et al. |
| 5,369,784 A | 11/1994 | Nelson |
| 5,400,254 A | 3/1995 | Fujita |
| 5,425,051 A | 6/1995 | Mahany |

(Continued)

FOREIGN PATENT DOCUMENTS

EP    0467036 A2    1/1992

(Continued)

OTHER PUBLICATIONS

Gary Morgan, Miniature Tags Provide Visibility & Cohesion for an LIA Battalion Level 'Proof of Principle', Pacific NW National Laboratory, Apr. 2001, Gary.morgan@pnl.gov.

(Continued)

*Primary Examiner*—Mark Hellner
(74) *Attorney, Agent, or Firm*—Tillman Wright, PLLC; Chad D. Tillman; James D. Wright

(57) ABSTRACT

A method for determining a terrestrial location of an apparatus that is deployed in a generally known geographical region includes capturing, by the apparatus, an earthbound image of the sky from a terrestrial location at an identified time; communicating, by the apparatus, data representative of the captured earthbound image of the sky; and determining the terrestrial location of the apparatus based on the data communicated by the apparatus by comparing the captured earthbound image of the sky to a master mapping of the sky relative to the surface of the Earth.

18 Claims, 4 Drawing Sheets

U.S. PATENT DOCUMENTS

| | | | |
|---|---|---|---|
| 5,442,758 A | 8/1995 | Slingwine et al. |
| 5,511,232 A | 4/1996 | O'Dea et al. |
| 5,579,306 A | 11/1996 | Dent |
| 5,590,409 A | 12/1996 | Sawahashi et al. |
| 5,596,652 A | 1/1997 | Piatek et al. |
| 5,604,892 A | 2/1997 | Nuttall et al. |
| 5,640,151 A | 6/1997 | Reis et al. |
| 5,652,751 A | 7/1997 | Sharony |
| 5,682,379 A | 10/1997 | Mahany et al. |
| 5,686,902 A | 11/1997 | Reis et al. |
| 5,732,077 A | 3/1998 | Whitehead |
| 5,761,195 A | 6/1998 | Lu et al. |
| 5,790,946 A | 8/1998 | Rotzoll |
| 5,793,882 A | 8/1998 | Piatek et al. |
| 5,833,910 A | 11/1998 | Teixido |
| 5,890,054 A | 3/1999 | Logsdon et al. |
| 5,907,491 A | 5/1999 | Canada et al. |
| 5,917,423 A | 6/1999 | Duvall |
| 5,939,982 A | 8/1999 | Gagnon et al. |
| 5,943,610 A | 8/1999 | Endo |
| 5,950,124 A | 9/1999 | Trompower et al. |
| 5,974,236 A | 10/1999 | Sherman |
| 5,977,913 A | 11/1999 | Christ |
| 6,005,884 A | 12/1999 | Cook et al. |
| 6,006,100 A | 12/1999 | Koenck et al. |
| 6,072,784 A | 6/2000 | Agrawal et al. |
| 6,078,789 A | 6/2000 | Bodenmann et al. |
| 6,091,724 A | 7/2000 | Chandra et al. |
| 6,097,707 A | 8/2000 | Hodzic et al. |
| 6,104,512 A | 8/2000 | Batey, Jr. et al. |
| 6,118,988 A | 9/2000 | Choi |
| 6,125,306 A | 9/2000 | Shimada et al. |
| 6,127,976 A | 10/2000 | Boyd et al. |
| 6,134,587 A | 10/2000 | Okanoue |
| 6,192,400 B1 | 2/2001 | Hanson et al. |
| 6,198,913 B1 | 3/2001 | Sung et al. |
| 6,201,974 B1 | 3/2001 | Lietsalmi et al. |
| 6,256,303 B1 | 7/2001 | Drakoulis et al. |
| 6,313,745 B1 | 11/2001 | Suzuki |
| 6,354,493 B1 | 3/2002 | Mon |
| 6,360,169 B1 | 3/2002 | Dudaney |
| 6,381,467 B1 | 4/2002 | Hill et al. |
| 6,404,082 B1 | 6/2002 | Rasinski et al. |
| 6,405,102 B1 | 6/2002 | Swartz et al. |
| 6,409,082 B1 | 6/2002 | Davis et al. |
| 6,418,299 B1 | 7/2002 | Ramanathan |
| 6,424,260 B2 | 7/2002 | Maloney |
| 6,424,264 B1 | 7/2002 | Giraldin et al. |
| 6,427,913 B1 | 8/2002 | Maloney |
| 6,473,607 B1 | 10/2002 | Shohara et al. |
| 6,512,478 B1 | 1/2003 | Chien |
| 6,529,142 B2 | 3/2003 | Yeh et al. |
| 6,542,114 B1 | 4/2003 | Eagleson et al. |
| 6,547,137 B1 | 4/2003 | Begelfer et al. |
| 6,559,620 B2 | 5/2003 | Zhou et al. |
| 6,600,418 B2 | 7/2003 | Francis et al. |
| 6,611,556 B1 | 8/2003 | Koener et al. |
| 6,614,349 B1 | 9/2003 | Proctor et al. |
| 6,665,585 B2 | 12/2003 | Kawase |
| 6,700,533 B1 | 3/2004 | Werb et al. |
| 6,720,888 B2 | 4/2004 | Eagleson et al. |
| 6,737,974 B2 | 5/2004 | Dickinson |
| 6,745,027 B2 | 6/2004 | Twitchell, Jr. |
| 6,747,562 B2 | 6/2004 | Giraldin et al. |
| 6,753,775 B2 | 6/2004 | Auerbach et al. |
| 6,760,578 B2 | 7/2004 | Rotzoll |
| 6,761,312 B2 | 7/2004 | Piatek et al. |
| 6,765,484 B2 | 7/2004 | Eagleson et al. |
| 6,816,063 B2 | 11/2004 | Kubler et al. |
| 6,847,892 B2 | 1/2005 | Zhou et al. |
| 6,934,540 B2 | 8/2005 | Twitchell, Jr. |
| 6,940,392 B2 | 9/2005 | Chan et al. |
| 6,975,614 B2 | 12/2005 | Kennedy |
| 7,012,529 B2 | 3/2006 | Sajkowsky |
| 7,027,773 B1 | 4/2006 | McMillin |
| 7,098,784 B2 | 8/2006 | Easley et al. |
| 7,126,470 B2 | 10/2006 | Clift et al. |
| 7,133,704 B2 | 11/2006 | Twitchell, Jr. |
| 7,142,121 B2 | 11/2006 | Chan et al. |
| 7,155,264 B2 | 12/2006 | Twitchell, Jr. |
| 7,191,934 B2 | 3/2007 | Miller et al. |
| 7,200,132 B2 | 4/2007 | Twitchell, Jr. |
| 7,209,468 B2 | 4/2007 | Twitchell, Jr. |
| 7,209,771 B2 | 4/2007 | Twitchell, Jr. |
| 7,221,668 B2 | 5/2007 | Twitchell, Jr. |
| 7,349,803 B2 * | 3/2008 | Belenkii et al. ............ 701/222 |
| 7,349,804 B2 * | 3/2008 | Belenkii et al. ............ 701/222 |
| 2001/0000019 A1 | 3/2001 | Bowers et al. |
| 2002/0039896 A1 | 4/2002 | Brown |
| 2002/0098861 A1 | 7/2002 | Doney et al. |
| 2002/0119770 A1 | 8/2002 | Twitchell, Jr. |
| 2002/0146985 A1 | 10/2002 | Naden |
| 2003/0083064 A1 | 5/2003 | Cooper |
| 2003/0141973 A1 | 7/2003 | Yeh et al. |
| 2003/0144020 A1 | 7/2003 | Challa et al. |
| 2003/0179073 A1 | 9/2003 | Ghazarian |
| 2003/0209601 A1 | 11/2003 | Chung |
| 2004/0021572 A1 | 2/2004 | Schoen et al. |
| 2004/0041731 A1 | 3/2004 | Hisano |
| 2004/0082296 A1 | 4/2004 | Twitchell, Jr. |
| 2004/0100415 A1 | 5/2004 | Veitch et al. |
| 2004/0121793 A1 | 6/2004 | Weigele et al. |
| 2004/0135691 A1 | 7/2004 | Duron et al. |
| 2004/0183673 A1 | 9/2004 | Nageli |
| 2005/0043068 A1 | 2/2005 | Shohara et al. |
| 2005/0093702 A1 | 5/2005 | Twitchell, Jr. |
| 2005/0093703 A1 | 5/2005 | Twitchell, Jr. |
| 2005/0215280 A1 | 9/2005 | Twitchell, Jr. |
| 2005/0226201 A1 | 10/2005 | McMillin |

FOREIGN PATENT DOCUMENTS

| | | |
|---|---|---|
| EP | 0748083 | 12/1996 |
| EP | 0748085 | 12/1996 |
| EP | 0829995 | 3/1998 |
| EP | 1317733 A2 | 6/2003 |
| EP | 1692599 A2 | 8/2006 |
| EP | 1692668 A2 | 8/2006 |
| WO | WO0068907 | 11/2000 |
| WO | WO0069186 | 11/2000 |

OTHER PUBLICATIONS

Ben Sommer et al., Group 4, Passive RF Tags.

Kevin Sharp, Physical Reality: A Second Look, Supply Chain Systems, http://www.idsystems.com/reader/1999_03/phys0399_pt2/index.htm, Mar. 1999, Helmers Publishing, Inc.

U.S. Appl. No. 60/444,029, of Nageli, filed Jan. 31, 2003.

Ram Ramanathan et al., Hierarchically-Organized, Multihop Mobile Wireless Networks for Quality-of-Service Support, pp. 1-35, 1998.

Guangyu Pei et al., Mobility Management in Hierarchical Multi-hop Mobile Wireless Networks, 6 pages, 1999.

http://www/iprg/nokia.com/charliep/txt/manet/term.txt, Mobile Ad Hoc Networking Terminology, C. Perkins, Nov. 17, 1998, visited Nov. 13, 2000.

Daniel Lihui Gu et al., C-ICAMA, A Centralized Intelligent Channel Assigned Multiple Access for Multi-Layer Ad-Hoc Wireless Networks with UAVs, 6 pages, 2000.

Atsushi Iwata, et al., Scalable Routing Strategies for Ad Hoc Wireless Networks, IEEE Journal on Selected Areas in Communications, vol. 17, No. 8, Aug. 1999, pp. 1369-1379.

http://www.cs.ucla.edu/NRL/wireless/PAPER/draft-ietf-manet-admrp-02.txt, Sung-Ju Lee et al., On-Demand Multicast Routing Protocol (ODMRP) for Ad Hoc Networks, Jan. 2000, visited Nov. 13, 2000.

Guangyu Pei, et al., A Wireless Hierarchical Routing Protocol with Group Mobility, 1998 IEEE, 5 pages.

Charles E. Perkins, Ad Hoc Networks, Jan. 2001, table of contents, chapters 1, 4, and 11.

J.J. Gardia-Luna-Aceves et al., Source-Tree Routing in Wireless Networks, 1999, 10 pages.

Jean-Pierre Hubaux et al., Toward Self-Organized Mobile Ad Hoc Networks: The Terminodes Project, IEEE Communications Magazine, Jan. 2001, pp. 118-124.

Jaap Haartsen et al., Bluetooth: Vision, Goals, and Architecture, Mobile Computing & Communications Review, vol. 1, No. 2, 1998, 8 pages.

Jaap Haartsen, Bluetooth—The Universal Radio Interface for Ad Hoc, Wireless Connectivity, Ericsson Review No. 3, pp. 110-117, 1998.

Ezio Valdevit, Cascading in Fibre Channel: How to Build a Multi-Switch Fabric, pp. 1-12.

Daniel Lihui Gu et al., Hierarchical Routing for Multi-Layer Ad-Hoc Wireless Networks with UAV's, 5 pages, 2000.

U.S. Appl. No. 60/499,338, of Easley et al., filed Sep. 3, 2003.

Keshavarzian et al., Energy-Efficient Link Assessment in Wireless Sensor Networks, Infocom 2004. 23rd Annual Joint Conference of the IEEE Computer and Communications Societies, vol. 3, 2004, pp. 1751-1761.

Stojmenovic et al., Design Giudelines for Routing Protocols in Ad Hoc and Sensor Networks with a Realistic Physical Layer, Communications Magazine, IEEE, vol. 43, Issue 3, Mar. 2005, pp. 101-106.

Melodia et al., On the Interdependence of Distributed Topology Control and Geographical Routing in Ad Hoc and Sensor Networks, Selected Areas in Communications, IEEE Journal, Vol. 23, Issue 3, Mar. 2005, pp. 520-532.

"Scalable Routing Strategies for Ad hoc Wireless Networks", Atsushi Iwata et al., IEEE Journal on Selected Areas in Communications, Special Issue on Adhoc Networks, Aug. 1999, pp. 1369-1379.

"Cluster Based Routing Protocol", Internet-Draft Mingliang, Jiang et al., National University of Singapore, Jul. 1999.

* cited by examiner

US 7,542,849 B2

NETWORK AIDED TERRESTRIAL TRIANGULATION USING STARS (NATTS)

I. CROSS-REFERENCE TO RELATED APPLICATIONS

The present application is a nonprovisional of, and claims priority under 35 U.S.C. § 119(e) to Twitchell, U.S. Provisional Patent Application No. 60/687,073 filed Jun. 3, 2005. The entire disclosure of this patent application is hereby incorporated herein by reference.

II. INCORPORATION BY REFERENCE

The present application hereby incorporates by reference: Twitchell U.S. Pat. No. 6,934,540 titled "Network Formation in Asset-Tracking System Based on Asset Class"; Twitchell U.S. Pat. No. 6,745,027 titled "Class Switched Networks for Tracking Articles"; Twitchell U.S. Patent Application Publication No. 20060018274 titled "Communications within Population of Wireless Transceivers Based on Common Designation"; and Twitchell U.S. Patent Application Publication No. 20050215280 titled "LPRF Device Wake Up Using Wireless Tag."

III. COPYRIGHT STATEMENT

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

IV. BACKGROUND OF THE INVENTION

Determining the positions of remote communications devices and assets to which they may be attached is a critical challenge for which previously available solutions are increasingly inadequate. For example, when a remote communications device is in communication with a Wide Area Network (WAN) transmitter, location of the communications device on a macro scale is available by way of knowledge of both the position of the WAN transmitter and the maximum effective range of the communication.

Techniques for determining more precisely the location of an asset are available. Such techniques involve determining Time of Arrival (TOA) and Time Difference of Arrival (TDOA) of radio frequency (RF) signals to deduce distances between wireless devices. In addition, determinations of Angle of Arrival (AOA) are utilized to deduce directions of signals. Global Positioning System (GPS) technology is also available for determining, with relatively high precision, the locations of assets equipped with specialized receivers that measure time travel of radio signals from satellites. However, these known technologies are vulnerable in that electronic signal jamming technologies are capable of blocking wireless signals to deny the ability to locate assets. Accordingly, a method of determining the location of a communications device that is not susceptible to jamming technologies is needed.

Celestial navigation is a position fixing technique that was the first system devised to help sailors locate themselves on a featureless ocean. Celestial navigation uses angular measurements, i.e., sights, between the horizon and a common celestial object. The Sun is most often measured. Skilled navigators can use the Moon, planets or one of the 57 "navigational stars" that are described in nautical almanacs. Sights on the moon, planet and stars allow navigation to occur at night or when clouds obscure other objects.

Celestial navigation works because at any given instant of time, any particular celestial object will be directly over a particular geographic position on the Earth, i.e., it will have an exact latitude and longitude. The actual angle to the celestial object locates the navigator on a circle on the surface of the Earth. Every location on the circle has the same angle to the celestial object. The circle will be centered on the celestial object's latitude and longitude. Two or three sights on different objects, or at different times, establish that the navigator is at the intersection of several such circles. The sights are reduced to positions by simple methods that add and subtract logarithms of trigonometric values taken from tables.

Practical celestial navigation usually requires a chronometer to measure time, a sextant to measure the angles, an almanac giving angular schedules of celestial objects, a set of sight reduction tables to help perform the math, and a chart of the region. With sight reduction tables, the only math required is addition and subtraction. Small handheld computers and laptops enable modern navigators to "reduce" sextant sights in minutes, by automating all the calculation and data lookup steps.

Celestial navigation is not dependent on receipt of RF signals. Therefore, it would be advantageous to be able to use the basic techniques of celestial navigation to determine the location of remote communications devices.

V. SUMMARY OF THE INVENTION

The present invention includes many aspects and features.

In an aspect of the invention, an apparatus comprises an imaging component configured to capture an earthbound image of the sky from a terrestrial location, a chronometric component that measures time synchronously with standard time, and a communication component configured to wirelessly transmit data representative of a captured earthbound image of the sky. Preferably the chronometric component is a clock that accurately measures time. Standard time is the official time in a local region, adjusted for location around the Earth and is established by law or custom. Accordingly, the chronometric component of the apparatus measures time in synchrony with standard time. The apparatus also comprises a controller that is arranged in electronic communication with the imaging component, the chronometric component, and the communication component. The controller is configured to cause an earthbound image of the sky to be captured using the imaging component at a time identified by the chronometric component and data representative of the captured earthbound image to be wirelessly transmitted. With regard to the controller, it is preferred that configured means programmed.

In a feature of the aspect, the controller is further configured to cause data representative of the identified time that the earthbound image of the sky is captured to be wirelessly transmitted in conjunction with the transmission of the data representative of the captured image.

In another feature of the aspect, the apparatus further comprises an internal power supply for powering of the imaging component, the chronometric component, the communication component, and the controller. Further, the controller comprises a microcontroller. In yet another feature, the controller comprises a microprocessor.

In an additional feature, the controller is configured to cause, in response to the occurrence of a predetermined event, an earthbound image of the sky to be captured using the imaging component, the time at which the earthbound image was captured to be identified using the chronometric component, and data representative of the captured earthbound image and identified time to be wirelessly transmitted. In a further feature of this aspect, the controller is configured to cause, in response to the expiration of a predetermined period of time, an earthbound image of the sky to be captured using the imaging component, and data representative of the captured earthbound image to be wirelessly transmitted.

In still yet another feature, the apparatus further comprises a receiver for receiving wireless communications. In accordance with this feature, the controller is configured to cause, in response to an instruction wirelessly received in a communication by the receiver, an earthbound image of the sky to be captured using the imaging component, the time at which the earthbound image was captured to be identified using the chronometric component, and data representative of the captured earthbound image and identified time to be wirelessly transmitted.

In an additional feature, the imaging component comprises a charge-coupled device (CCD). In accordance with this feature, the CCD collects electromagnetic radiation at wavelengths below 2000 Angstroms. In furtherance of this feature, the CCD collects electromagnetic radiation at wavelengths above 7000 Angstroms. In another feature, the imaging component is configured to process a captured earthbound image of the sky. It is preferred that the processing comprises homomorphic filtering. The image may include the sun and/or other stars; the moon; and/or other celestial bodies in the sky.

In a further feature, the imaging component is configured to capture an earthbound image of the sky at night. In another feature of this aspect, the apparatus comprises an accelerometer. With regard to this feature, the apparatus further comprises a compass, wherein the apparatus is mobile and wherein the controller is arranged in electronic communication with the accelerometer and the compass and is configured to cause data representative of movement of the apparatus to be wirelessly transmitted in conjunction with the transmission of the data representative of the captured earthbound image. It is preferred that the compass is a gyrocompass.

In another feature, the imaging component is configured to capture an earthbound image of the sky during daylight hours. In accordance with this feature, the controller is configured to cause a plurality of earthbound images of the sky to be captured using the imaging component at time intervals that are identified by the chronometric component, and is configured to cause data representative of the captured earthbound images to be wirelessly transmitted.

In still yet another feature, the apparatus is associated with an asset that is deployed within a generally known geographical region. An asset comprises a person or thing that is desired to be tracked or monitored. With respect to a person, an asset may be an employee, a team member, a law enforcement officer, or a member of the military. With respect to a thing or article, an asset may be, for example, a good, product, package, item, vehicle, warehoused material, baggage, passenger, luggage, shipping container, belonging, commodity, effect, resource, merchandise or sensor. It is preferred that the asset comprises a sensor. Although the exact location of the asset is unknown, a general location of the asset within a geographic region is known. For example, the country within which the asset is located is known.

In furtherance of this feature, the apparatus comprises a node of a remote sensor interface (RSI) network. An RSI network as used herein and in some of the incorporated references represents a network, nodes of which (and specifically, the data communications devices of the nodes of which) each are disposed in electronic communication with one or more sensors for acquiring data there from. The RSI network may be a class-based network, in which case the nodes also share a common class designation representative of an asset class. For instance, the embodiment of the class-based networks described in U.S. Pat. No. 6,745,027 and in application publication no. US 2005/0093703 A1, each comprises an RSI network when the data communications devices of the nodes include sensor-acquired information obtained from associated sensors. The sensors may be temperature and humidity sensors, for example, for detecting the temperature and humidity relative to an asset being tracked or monitored, with the sensor-acquired information being communicated back to an application server upon acquisition of the data by the sensor or at a predetermined time, as desired. It is preferred that the RSI network comprises an ad hoc class-based network.

In another aspect of the invention, an apparatus for determining a terrestrial location comprises a computer and a computer readable medium accessible by the computer. The computer readable medium includes data representative of a master mapping of the sky relative to the surface of the Earth and computer-executable instructions for determining a terrestrial location based on data representative of a captured earthbound image of the sky and an identified time at which the earthbound image was captured.

In a feature of this aspect, the computer determines the terrestrial location by comparing the master mapping of the sky to the captured earthbound image. In accordance with this feature, the terrestrial location that is determined represents the terrestrial location from which the earthbound image of the sky was captured at the identified time.

In another feature of this aspect, the computer-executable instructions determine the terrestrial location further based on data indicative of movement, including data indicative of magnitudes of acceleration and deceleration, directions of acceleration and deceleration, and times of acceleration and deceleration. The terrestrial location that is determined represents a projection of travel from a terrestrial location from which the earthbound image of the sky was captured at the identified time. In an additional feature, the computer is disposed in electronic communication with a wide area network (WAN). In accordance with this aspect, the computer comprises a network interface to a cellular communications network. In another feature of this aspect, the computer comprises a network interface to a satellite communications network. In yet another feature of this aspect, the computer comprises a server that includes a network interface to the Internet.

In another aspect of the invention, a system comprises an apparatus that is deployed in a generally known geographical region. The deployed apparatus includes an imaging component configured to capture an earthbound image of the sky from a terrestrial location, a chronometric component that measures time synchronously with standard time, a communication component configured to wirelessly transmit data representative of a captured earthbound image of the sky, and a controller. The controller is arranged in electronic communication with the imaging component, the chronometric component, and the communication component. The controller is also configured to cause an earthbound image of the sky to be captured using the imaging component at a time identified by the chronometric component and data representative of the captured earthbound image to be wirelessly transmitted. The system further comprises an apparatus for determining a terrestrial location of the deployed apparatus within the generally known geographical region comprising a computer and a computer readable medium accessible by the computer. The computer readable medium includes data representative of a master mapping of the sky relative to the surface of the Earth and computer-executable instructions for determining a terrestrial location based on the data wirelessly transmitted from the deployed apparatus and the identified time at which the earthbound image was captured.

In a feature of this aspect, the system further comprises a plurality of deployed apparatus, each deployed apparatus including an imaging component configured to capture an earthbound image of the sky from a terrestrial location, a chronometric component that measures time synchronously with standard time, and a communication component configured to wirelessly transmit data representative of a captured earthbound image of the sky. The apparatus further includes a controller that is arranged in electronic communication with the imaging component, the chronometric component, and the communication component and configured to cause an earthbound image of the sky to be captured using the imaging component at a time identified by the chronometric component and data representative of the captured earthbound image to be wirelessly transmitted.

In furtherance of this feature, the plurality of deployed apparatus comprises sensors that are configured for monitoring of military troop movement. In accordance with this feature, a sensor of at least one deployed apparatus comprises a motion detector. With further regard to this feature, a sensor of at least one deployed apparatus comprises a microphone. In further accordance with this feature, a sensor of at least one deployed apparatus comprises a video camera.

With further regard to this feature, each of the plurality of deployed apparatus captures a plurality of earthbound images at predetermined time intervals. In accordance with this feature, the plurality of deployed apparatus comprise triangulating sensors that are configured to triangulate the position of a transmitter. The computer-executable instructions determine a terrestrial location of the transmitter based on the triangulation by the triangulating sensors, and the terrestrial location of each of the triangulating sensors is based on the data wirelessly transmitted from each triangulating sensor and the identified time at which each earthbound image was captured. With regard to this feature, the plurality of deployed apparatus includes a global positioning system receiver.

In yet another aspect of the invention, a method for determining a terrestrial location of an apparatus that is deployed in a generally known geographical region comprises the steps of capturing, by the apparatus, an earthbound image of the sky from a terrestrial location at an identified time; communicating, by the apparatus, data representative of the captured earthbound image of the sky; and determining the terrestrial location of the apparatus based on the data communicated by the apparatus by comparing the captured earthbound image of the sky to a master mapping of the sky relative to the surface of the Earth.

In a feature of this aspect, the data representative of the captured earthbound image of the sky that is communicated by the apparatus includes the identified time at which the earthbound image of the sky was captured. In another feature of this aspect, the method further comprises the initial step of deploying the apparatus within the geographical region. The identified time at which the earthbound image of the sky is captured is a time that is predetermined prior to deployment of the apparatus. In an additional feature, earthbound images of the sky are captured by the apparatus at predetermined time intervals.

In yet another feature of this aspect, the method further comprises processing the captured earthbound image of the sky prior to communicating the data representative of the captured earthbound image of the sky. In accordance with this feature, the processing comprises compensating for atmospheric distortions in the captured earthbound image of the sky. In furtherance of this feature, processing comprises sharpening of the captured earthbound image of the sky.

In an additional feature, the capturing of an earthbound image of the sky comprises capturing the earthbound image of the sky along a vertical skyward axis local to the terrestrial location at which the image is captured. In yet another feature, the method further comprises performing correction calculations for the captured earthbound image of the sky when the earthbound image of the sky is not captured along a local vertical skyward axis, whereby the data representative of the captured earthbound image of the sky corresponds to an earthbound image of the sky that is captured along a vertical skyward axis local to the terrestrial location at which the image is captured. In accordance with this feature, the correction calculations utilize an angle measured between an axis of the captured earthbound image and the vertical skyward axis local to the terrestrial location at which the image is captured.

In another feature, the capturing of the earthbound image occurs at night. In yet another feature, the capturing of the earthbound image occurs in daylight.

In an additional feature, the step of determining the terrestrial location of the apparatus based on the data communicated by the apparatus by comparing the captured earthbound image of the sky to a master mapping of the sky relative to the surface of the Earth includes manipulating the master map of the sky into a model in which the shape of a sphere is disposed above the surface of the Earth; projecting latitude and longitude lines perpendicularly from the surface of the Earth onto the master mapping of the sky; comparing the captured earthbound image to the manipulated master mapping of the sky; and matching the captured earthbound image to the manipulated master mapping of the sky and reading the latitude and longitude values on the manipulated master map of the sky at the point where the captured earthbound image most closely matches the manipulated master map of the sky, thereby determining the terrestrial location from which the earthbound image was captured by the deployed apparatus.

In another feature, the step of communicating, by the apparatus, data representative of the captured earthbound image of the sky comprises wirelessly communicating, by the apparatus, the data representative of the captured earthbound image of the sky. In furtherance of this feature, the wireless communications comprise radio frequency communications.

In a further feature, the method further comprises communicating the data representative of the captured earthbound image of the sky over a wide area network (WAN). In another feature, the method further comprises communicating the data representative of the captured earthbound image of the sky over a satellite communications network. In yet another feature, the method further comprises communicating the data representative of the captured earthbound image of the sky over a cellular communications network. In an additional feature, the method further comprises communicating the data representative of the captured earthbound image of the sky over the Internet. In still yet another feature, the method further comprises communicating the determined terrestrial location of the apparatus to the apparatus.

In addition to the aforementioned aspects and features of the present invention, it should be noted that the present invention further includes the various possible combinations of such aspects and features.

VI. BRIEF DESCRIPTION OF THE DRAWINGS

One or more embodiments of the present invention will be described in detail with reference to the accompanying drawings which are briefly described below, and wherein the same elements are referred to with the same reference numerals.

VII. DETAILED DESCRIPTION

Figure 1:
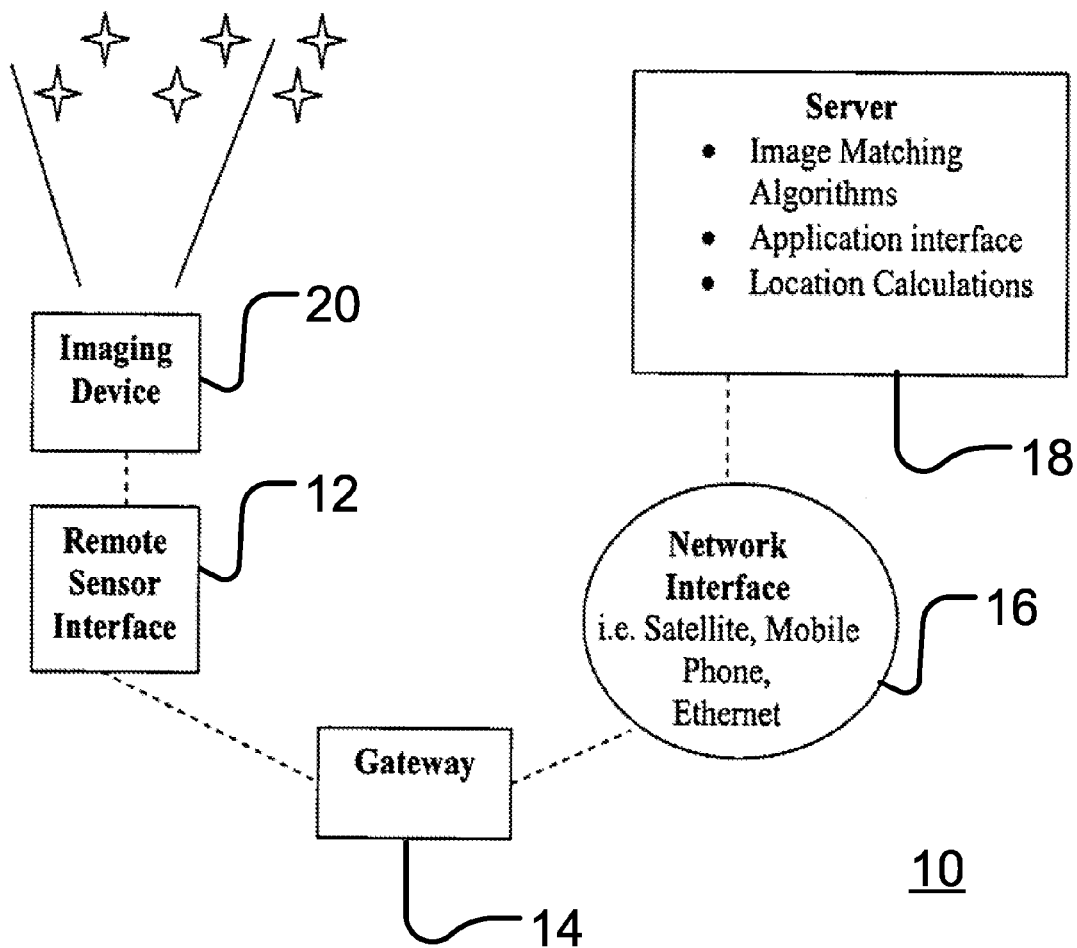
FIG. 1 is a block diagram illustrating a locator system in accordance with a preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed, to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, one or more preferred embodiments of the present invention are next described. The following description of one or more preferred embodiments is merely exemplary in nature and is not intended to limit the invention or uses.

FIG. 1 is a block diagram illustrating a locator system in accordance with a preferred embodiment of the present invention. The locator system 10 is able to determine a terrestrial location of a communications device 12 by utilizing celestial image data collected at the terrestrial location or site of the communications device 12 and the basic techniques of celestial navigation. The locator system may be utilized to determine the location of the communications device at a single particular instant of time and may also be used to track the location of the communications device over a particular period of time. The locator system 10 preferably comprises a communications device 12 in the form of a remote sensor interface in electronic communication with an imaging device 20; a gateway 14; a network interface 16; and a server 18.

Figure 2:
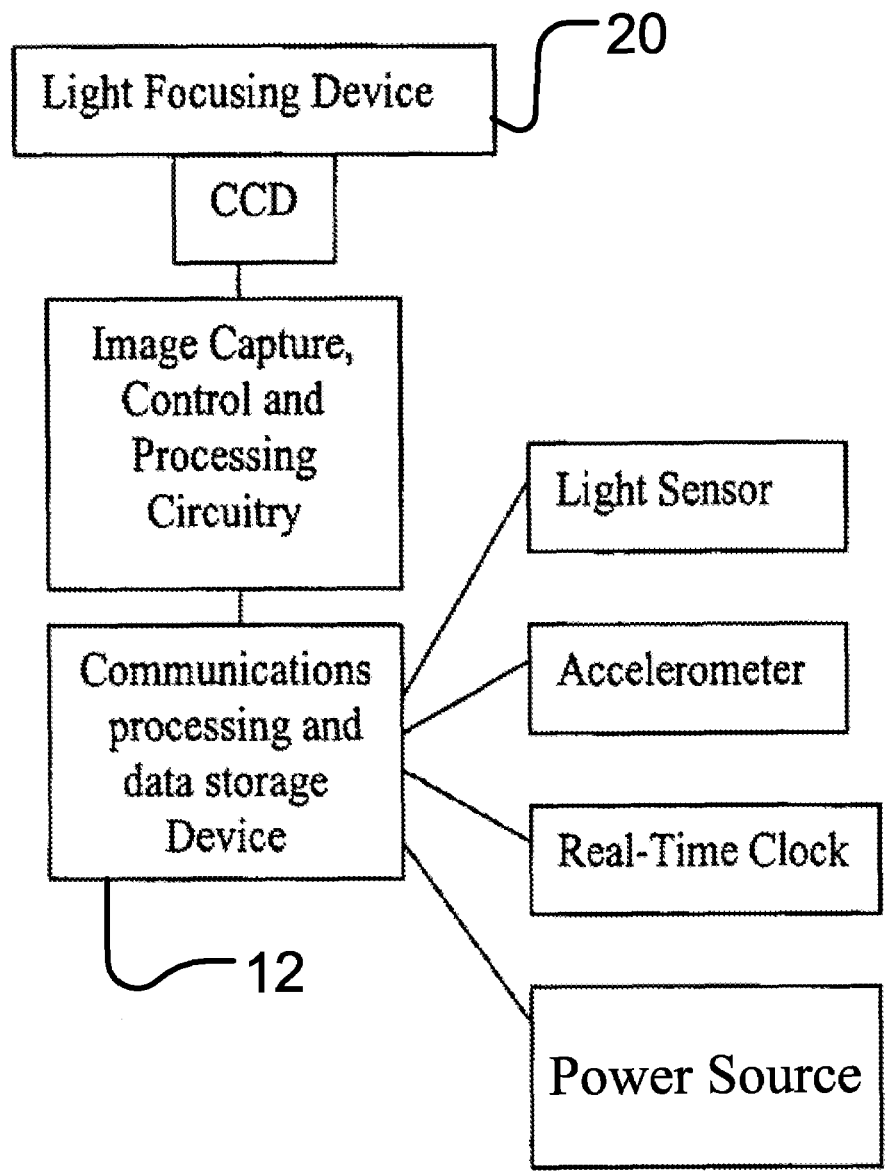
FIG. 2 is a block diagram illustrating the components and functioning of the communications device and the imaging device.

FIG. 2 is a block diagram illustrating components and functioning of the communications device 12 and the imaging device 20. The imaging device 20 is used to capture earthbound images of the sky including stars that are in view of the communications device 12. Such images are used to determine by the server 18 the terrestrial location of the communications device 12, as described in further detail below.

In a preferred embodiment, the imaging device 20 is a photosensitive charge-coupled device (CCD). A CCD is a sensor used for recording images comprising an integrated circuit containing an array of linked, or coupled, capacitors. CCD units commonly respond to 70% of incident light, as opposed to photographic film, which captures only about 2% of incident light. As a result, CCD units are favored for use by astronomers. In a CCD, an image is projected by a lens on the capacitor array, causing each capacitor of the array to accumulate an electric charge proportional to the light intensity at that location. A two-dimensional array captures the whole image or a rectangular portion thereof. Once the array has been exposed to the image, a control circuit causes each capacitor to transfer its contents to its neighboring capacitor. The last capacitor in the array dumps its charge into an amplifier that converts such charge into a voltage. By repeating this process, the control circuit converts the entire contents of the array to a varying voltage, which it samples, digitizes and stores in memory. Stored images can then be transferred to another device such as a printer, a storage device, or a video display device.

Generally, CCD units vary in sensitivity to respective ranges of light. For example, a non-visible light unit can be used to collect images during daylight hours. Electromagnetic radiation of wavelengths below 2000 Angstroms (ultraviolet) and above 7000 Angstroms (infrared) can be collected to reduce or avoid daylight saturation from the visible spectrum. In processing the images collected by the CCD, digital signal processing techniques such as homomorphic filtering can be used to subtract out imaging distortions caused by sun light and terrestrial light. These functions can be performed at the communications device 12 and/or at the server 18.

In a preferred embodiment, the communications device 12 includes circuitry for image control and processing, a transmission component or device for communication processing, and a database for data storage. It is further preferred that the communications device 12 include a chronometric component such as a real-time clock in order to identify the time at which an earthbound image of the sky is captured. This may be accomplished by time stamping each earthbound image that is collected by the imaging device 20 so that precise times are determined for collected images. The communications device 12 further may include an accelerometer, a compass, and a light sensor. The accelerometer and compass, in conjunction with the chronometric component, collect data that aids in determining the terrestrial location of a mobile communications device 12 based on an earlier determined terrestrial location. This is particularly useful when an image of the sky cannot be captured due to environmental circumstances, such as weather. Also, in order to manage power consumption, the communications device 12 preferably utilizes "common designation" network technologies and "wake-up" technologies as disclosed in the references incorporated herein.

The gateway 14 is a communications device that is disposed in direct electronic communication with a wide area network (WAN) via a network interface 16. Communication between the gateway 14 and WAN is preferably wireless. As such, the gateway 14 may include a cellular transceiver for communication via a cellular telephone network, a satellite transceiver for communication via a satellite network, or combination thereof.

The server 18 is located at a relatively centralized location and is preferably disposed in electronic communication with the WAN, whereby the server 18 and the communications device 12 may communicate with one another via the gateway 14. In a preferred embodiment, the server 18 includes an image matching algorithm and a database containing a master mapping of the sky showing the stars in the sky in their respective locations. The image matching algorithm is used to compare the master mapping of the sky to the data received from the communications device 12 in order to determine the location of the communications device 12.

In the locator system 10, the data representative of a captured earthbound image is stored at the communications device 12 for communicating to the server 18. The data representative of a captured earthbound image may be communicated at predetermined time intervals, in response to the occurrence of predetermined events, and/or upon demand through an appropriate instructing that is received by the communications device 12. Furthermore, a plurality of captured earthbound images may be communicated to the server 18 at the same time or different times.

One or more data acquisition devices or sensors may be included with the communications device 12 or otherwise associated with the communications device 12 such that the communications device 12 is disposed in electronic communication for receiving data from the associated sensor. The sensor-acquired data preferably is also stored for communicating to the server 18. Moreover, this sensor-acquired data may be communicated at predetermined time intervals, in response to the occurrence of predetermined events, and/or upon demand through an appropriate instructing that is received by the communications device 12. Furthermore, the sensor-acquired data may be communicated in conjunction with the data representative of a captured earthbound image.

The communications device 12 may be attached to, or otherwise directly associated with, an asset. Moreover, the communications device 12 may form a node of a "class-based" network, which networks are disclosed in the references incorporated herein.

Communications from the communications device 12 to the server 18 preferably are wireless and occur directly or indirectly through the gateway 14 that provides access to the WAN. In this respect, the gateway 14 preferably includes a network interface capable of communicating, for example, with a satellite communications network, a cellular communications network, or an Ethernet network. The gateway 14 also may wirelessly communicate with the communications device 12 through radiofrequency communications within the ISM band or another band, as desired or appropriate. The gateway 14 further may be located at a fixed position or may be mobile. In this regard, the gateway 14 may be carried on an airplane or ground vehicle and may only intermittently communicate with the communications device 12, i.e., when within communications range.

As thus will be appreciated, the gateway 14 represents the gateway through which the communications device 12 sends communications to the WAN and, specifically, to the server 18 connected to the WAN. It will furthermore be appreciated that the communications device 12 is utilized to remotely collect data and transmit such data to the server 18 at a more centralized and known location.

In alternative preferred embodiments, the gateway 14 and server 18 may be combined and the WAN eliminated from the system. In such embodiments, the gateway includes the server computer, application software, and database representing the master mapping of the sky, whereby the server functions are performed at the gateway 14. In such alternative preferred embodiment, the gateway 14 may be mobile, temporarily stationary at a fixed location for a duration of time, or fixedly located at a location for an indefinite period of time.

Figure 3:
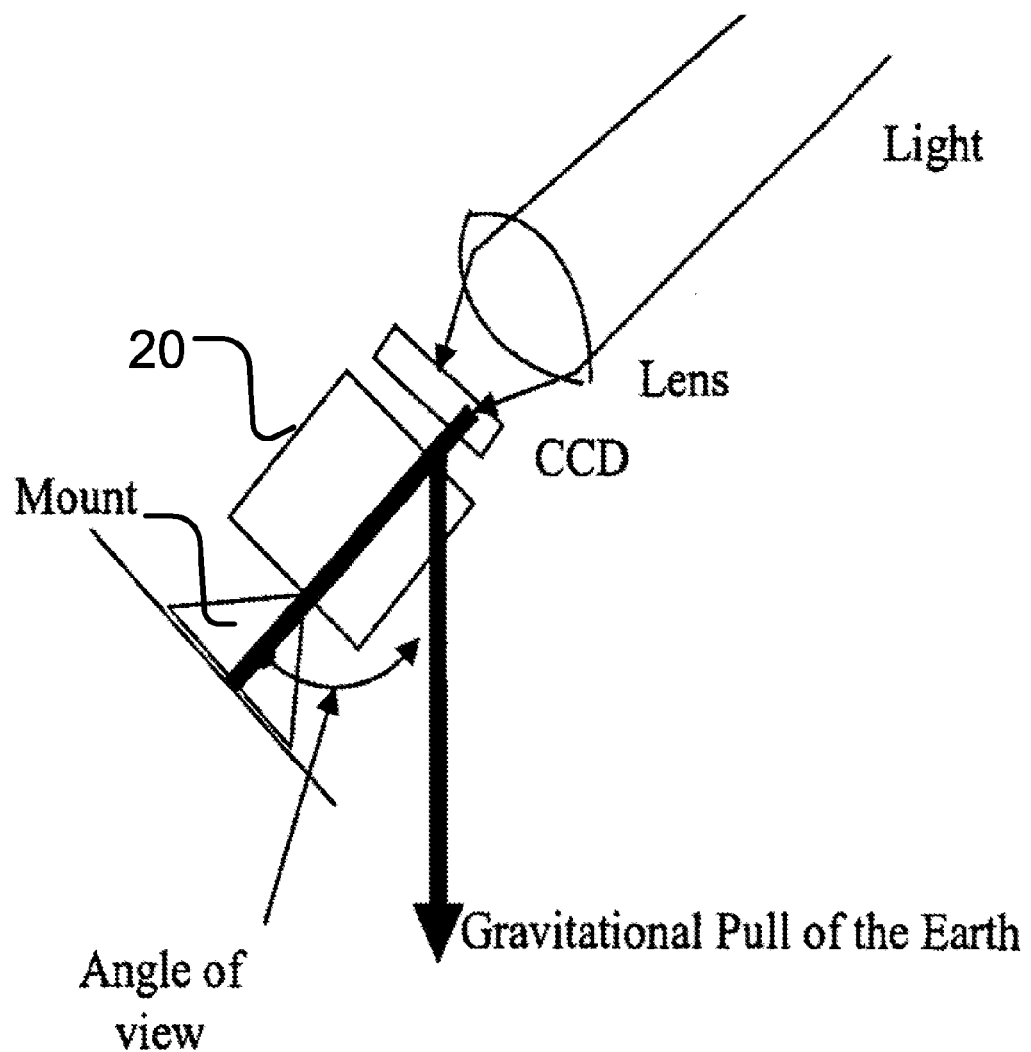
FIG. 3 is a schematic illustration depicting an exemplary set up configuration for a communications device and an imaging device.

In operation, celestial image data is collected at the communications device 12, and the collected image data is utilized to determine the location of the device 12. Specifically, the imaging device 20 collects image data at a particular location. FIG. 3 is a schematic illustration depicting an exemplary configuration for a communications device and an imaging device. Each image is preferably taken along a local vertical skyward axis, that is, parallel to the gravitational pull of the earth at the location where the image is taken. Alternatively, the angle between the axis of each image is determined relative to the local vertical axis, such as by determination of the direction of gravitational pull, and corrections are made for images that are not collected along a local vertical axis.

The communications device 12 receives the image data collected by the imaging device 20. The communications device 12 can perform some portion or all of the processing of the image data depending on the capabilities of the communications device 12. For example, the communications device can extract different resolutions from the CCD imaging device. Such precision facilitates pinpointing the location of the communications device 12. In addition, the image data is time-stamped by the communications device 12 using the real-time clock. Accelerometer data may also be collected by the communications device 12.

Figure 4:
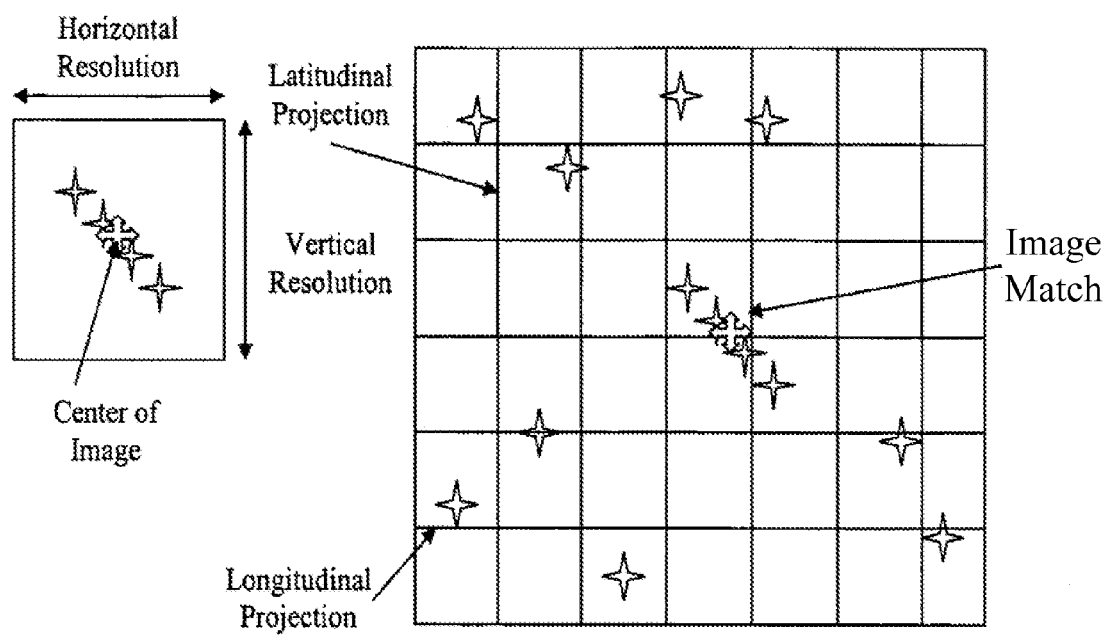
FIG. 4 is a schematic illustration depicting the process of matching collected image data to the master mapping of the stars in the sky.

The image data and other associated data are then sent to the server 18 via the gateway 14. The image matching algorithm of the server 18 processes the master mapping of the sky and the data sent from the communications device to determine the location of the communications device. FIG. 4 is a schematic illustration depicting the process of matching collected image data to the master mapping of the stars in the sky.

More particularly, the server 18 manipulates the master mapping of the sky into the shape of a sphere disposed above the surface of the Earth, in the appropriate dimensions to model the location of the stars with respect to the Earth. Then latitude and longitude lines are projected perpendicularly from the surface of the earth onto the master mapping of the sky. Collected image and time-stamp data is compared to the master mapping until a match is found. When the collected data is matched with the master mapping, the latitude and longitude lines that have been projected onto the master mapping may be read to determine the location at which the image was taken. Image processing techniques are utilized in compensating for atmospheric distortions and sharpening of the image to reduce light noise. Precision of the location determination is governed by the accuracy of the real-time clock that records the time each image is taken, resolution of the CCD, and precision of the master mapping of the stars in the sky. U.S. Patent Application Publication No. 2003/0156324 A1 contains further explanation regarding celestial navigation and the techniques thereof. The disclosure of this patent application related to celestial navigation is hereby incorporated herein by reference.

In addition, the positions, apparent sizes, and orientations of the sun, the moon, other celestial bodies, and horizons constitute further information optionally utilized in determining the location from which each image is taken.

Images can be taken intermittently and time-stamped, for example during dark hours of the night, for determination of absolute locations at absolute times. Location information for times between and beyond the times of the intermittently taken images can be determined by combining time-stamped absolute location information with relative movement information deduced from data collected from the accelerometer and the real-time clock. Thus location tracking is possible whether or not continuous image collection is possible or practiced.

Generally, multiple communications devices are participants in a wireless network. Some of these communications devices are at known or determinable locations. Such locatable communications devices may be used in determining locations of devices unable to collect skyward images, such as devices that are indoors, devices that are under some sort of cover that occludes skyward views, and devices lacking image-collecting capabilities. If multiple communications devices are utilized, relative directions of a particular device can be determined, and the location thereof can be triangulated or at least determined within some finite range.

The locator system in accordance with one or more preferred embodiments of the invention is particularly useful in situations involving mobile communications devices and in various weather conditions in which intermittently collected, time-stamped celestial image data can be combined with accelerometer data in deducing asset positions and in constructing time-position mappings revealing the movements of assets.

Implementations in accordance with one or more preferred embodiments of the invention provide many tactical and financial advantages. For example, costs are minimized by centralized data processing at the server without distribution of the database of celestial information, including the master mapping of the stars in the sky, to the communications devices. In addition, on-demand imaging and location determination promote long battery life. Further, the collection of skyward images cannot be jammed by RF interference devices. Distributed processing prevents interception of position information. Navigation information can be gleaned from position, and knowledge of the surroundings can be used to determine the status of a communications device.

Furthermore, implementations in accordance with one or more preferred embodiments of the invention have military advantages when used in hostile environments. For example, a mobile gateway may be located on an airplane that flies over a geographic region where communications devices, e.g., sensors, have been deployed. The mobile gateway may receive location information transmitted from the communications devices when the airplane flies over the geographical region in which the devices are located. This method of receiving location transmissions is advantageous, particularly in military applications, because if a rebel or insurgent (hereinafter "hostile") is able to intercept the communications that are transmitted to the gateway by the sensors, the information used to identify the exact locations of the sensors will be in a form that is either extremely difficult to interpret or, more likely, completely unusable to the hostile. In this respect, in order to determine the location of the devices, a hostile would need the master mapping of the sky and would need a computational system capable of processing the complex computational algorithms involved in interpreting the information from each sensor with respect to the master mapping of the sky. It is presumed that a hostile would not have such capabilities, and further presumed that a hostile would not have such capabilities in mobile form and/or readily disposable for use prior to the intercepted data becoming stale. The method of determining exact terrestrial locations of the sensors in this implementation thus is advantageous over simply transmitting locational data derived from a GPS receiver of a sensor, which may be more readily interpreted by a hostile.

Based on the foregoing description, it will be readily understood by those persons skilled in the art that the present invention is susceptible of broad utility and application. Accordingly, while one or more embodiments of the present invention have been described herein in detail, it is to be understood that this disclosure is only illustrative and exemplary and is made merely for the purpose of providing a full and enabling disclosure of the invention. The foregoing disclosure is not intended to be construed to limit the present invention or otherwise exclude any other embodiments, adaptations, variations, modifications or equivalent arrangements, the scope of the invention being limited only by the claims of an issued patent and the equivalents thereof.

What is claimed is:

1. A method for determining a terrestrial location of an apparatus that is deployed in a generally known geographical region, comprising the steps of:

(a) capturing, by the apparatus, an earthbound image of the sky from a terrestrial location at an identified time;
(b) communicating, by the apparatus, data representative of the captured earthbound image of the sky; and
(c) determining the terrestrial location of the apparatus based on the data communicated by the apparatus by comparing the captured earthbound image of the sky to a master mapping of the sky relative to the surface of the Earth;
(d) wherein said determining step includes,
  (i) manipulating the master map of the sky into a model in which the shape of a sphere is disposed above the surface of the Earth,
  (ii) projecting latitude and longitude lines perpendicularly from the surface of the Earth onto the master mapping of the sky,
  (iii) comparing the captured earthbound image to said manipulated master mapping of the sky, and
  (iv) matching said captured earthbound image to said manipulated master mapping of the sky and reading the latitude and longitude values on said manipulated master map of the sky at the point where said captured earthbound image most closely matches said manipulated master map of the sky, thereby determining the terrestrial location from which the earthbound image was captured by the deployed apparatus.

2. The method of claim 1, wherein the data representative of the captured earthbound image of the sky that is communicated by the apparatus includes the identified time at which the earthbound image of the sky was captured.

3. The method of claim 1, wherein earthbound images of the sky are captured by the apparatus at predetermined time intervals.

4. The method of claim 1, further comprising processing said captured earthbound image of the sky prior to communicating the data representative of the captured earthbound image of the sky.

5. The method of claim 4, wherein the processing comprises compensating for atmospheric distortions in the captured earthbound image of the sky.

6. The method of claim 4, wherein processing comprises sharpening of the captured earthbound image of the sky.

7. The method of claim 1, wherein said capturing of an earthbound image of the sky comprises capturing the earthbound image of the sky along a vertical skyward axis local to the terrestrial location at which the image is captured.

8. The method of claim 1, further comprising performing correction calculations for the captured earthbound image of the sky when the earthbound image of the sky is not captured along a local vertical skyward axis, whereby the data representative of the captured earthbound image of the sky corresponds to an earthbound image of the sky that is captured along a vertical skyward axis local to the terrestrial location at which the image is captured.

9. The method of claim 8, wherein said correction calculations utilize an angle measured between an axis of the captured earthbound image and the vertical skyward axis local to the terrestrial location at which the image is captured.

10. The method of claim 1, wherein said capturing of the earthbound image occurs at night.

11. The method of claim 1, wherein said capturing of the earthbound image occurs in daylight.

12. A method for determining a terrestrial location of an apparatus that is deployed in a generally known geographical region, comprising the steps of:
(a) deploying the apparatus within the geographical region;
(b) capturing, by the apparatus, an earthbound image of the sky from a terrestrial location at an identified time;
(c) communicating, by the apparatus, data representative of the captured earthbound image of the sky; and
(d) determining the terrestrial location of the apparatus based on the data communicated by the apparatus by comparing the captured earthbound image of the sky to a master mapping of the sky relative to the surface of the Earth;
(e) wherein the identified time at which the earthbound image of the sky is captured is a time that is predetermined prior to deployment of the apparatus; and
(f) wherein said step of determining the terrestrial location of the apparatus based on the data communicated by the apparatus by comparing the captured earthbound image of the sky to a master mapping of the sky relative to the surface of the Earth includes,
  (i) manipulating the master map of the sky into a model in which the shape of a sphere is disposed above the surface of the Earth;
  (ii) projecting latitude and longitude lines perpendicularly from the surface of the Earth onto the master mapping of the sky;
  (iii) comparing the captured earthbound image to said manipulated master mapping of the sky; and
  (iv) matching said captured earthbound image to said manipulated master mapping of the sky and reading the latitude and longitude values on said manipulated master map of the sky at the point where said captured earthbound image most closely matches said manipulated master map of the sky, thereby determining the terrestrial location from which the earthbound image was captured by the deployed apparatus.

13. The method of claim 1, wherein said step of communicating, by the apparatus, data representative of the captured earthbound image of the sky comprises wirelessly communicating, by the apparatus, the data representative of the captured earthbound image of the sky.

14. The method of claim 13, wherein the wireless communications comprise radio frequency communications.

15. The method of claim 1, further comprising communicating the data representative of the captured earthbound image of the sky over a wide area network (WAN).

16. The method of claim 1, further comprising communicating the data representative of the captured earthbound image of the sky over a satellite communications network.

17. The method of claim 1, further comprising communicating the data representative of the captured earthbound image of the sky over a cellular communications network.

18. The method of claim 1, further comprising communicating the data representative of the captured earthbound image of the sky over the Internet.

* * * * *